United States Patent [19]

Andersson

[11] Patent Number: 5,697,054
[45] Date of Patent: Dec. 9, 1997

[54] METHOD AND APPARATUS FOR LOAD SHARING TRANSCEIVER HANDLERS IN REGIONAL PROCESSORS OF RADIO COMMUNICATIONS SYSTEMS

[75] Inventor: Hans Andersson, Vreta Kloster, Sweden

[73] Assignee: Telefonaktiebolaget LM Ericsson, Stockholm, Sweden

[21] Appl. No.: 796,900

[22] Filed: Feb. 6, 1997

Related U.S. Application Data

[63] Continuation of Ser. No. 260,905, Jun. 15, 1994, abandoned.

[51] Int. Cl.$^6$ ............................................. H04Q 8/30
[52] U.S. Cl. ........................... 455/33.1; 455/9; 455/56.1; 379/59
[58] Field of Search ................................ 455/9, 33.1, 33.2, 455/33.4, 56.1, 54.1, 62; 379/59, 60

[56] References Cited

U.S. PATENT DOCUMENTS

| | | | |
|---|---|---|---|
| 4,435,840 | 3/1984 | Kojima et al. | 455/56.1 |
| 4,612,415 | 9/1986 | Zdunek et al. | 455/56.1 |
| 4,670,899 | 6/1987 | Brody et al. | 455/56.1 |
| 4,759,051 | 7/1988 | Han | 379/59 |
| 4,974,256 | 11/1990 | Cyr et al. | 379/59 |
| 5,021,801 | 6/1991 | Smith et al. | 455/56.1 |
| 5,034,993 | 7/1991 | Sasuta et al. | 455/34.1 |
| 5,105,420 | 4/1992 | Ardon et al. | 370/16 |
| 5,179,720 | 1/1993 | Grube et al. | 379/59 |
| 5,187,807 | 2/1993 | Alard et al. | 455/53.1 |
| 5,241,685 | 8/1993 | Bodin et al. | 455/33.2 |
| 5,241,686 | 8/1993 | Charbonnier | 455/33.2 |
| 5,379,448 | 1/1995 | Ames et al. | 455/56.1 |

FOREIGN PATENT DOCUMENTS

| | | |
|---|---|---|
| 0 534 716 A2 | 3/1993 | European Pat. Off. |
| 64-48537 | 2/1989 | Japan. |
| 9014720 | 11/1990 | WIPO. |

*Primary Examiner*—Edward F. Urban
*Attorney, Agent, or Firm*—Burns, Doane, Swecker & Mathis, L.L.P.

[57] ABSTRACT

A method for significantly more effective use of regional processor devices connected to a central processor (e.g., a node in GSM/CME2O1) in a cellular radio communications system by introducing load sharing between regional processor devices, thereby redressing the problems of too high a regional processor device load and too low a regional processor device load.

11 Claims, 3 Drawing Sheets

METHOD AND APPARATUS FOR LOAD SHARING TRANSCEIVER HANDLERS IN REGIONAL PROCESSORS OF RADIO COMMUNICATIONS SYSTEMS

This application is a continuation of application Ser. No. 08/260,905, filed Jun. 15, 1994, now abandoned.

BACKGROUND OF THE INVENTION

1) Field of the Invention

The present invention relates to a method of and apparatus for increasing the efficiency of transceivers used in a cellular radio communications system by introducing load sharing between regional processor devices.

2) Discussion of Related Art

Typical telephone exchanges (such as AXE) are usually built around a powerful central processor (CP), supported by a number of simple regional processors (RP's). Conventionally, the central processor performs the complex tasks, while the regional processors are dedicated to simple routine tasks (such as scanning).

Recent applications have changed the tasks of the regional processors to some degree. For example, the special needs in mobile communication have forced the regional processors to perform complex tasks (e.g., advanced locating calculations). This has created a demand for more powerful regional processors. The latest generation of regional processors are quite powerful and are built with state-of-the-art microprocessor technology. Nevertheless, various applications are suffering from both 'too high' as well an 'too low' regional processor loads.

SUMMARY OF THE INVENTION

A method for significantly more effective use of regional processor devices connected to a central processor in a cellular radio communications system by introducing load sharing between regional processor devices, thereby redressing the problems of too high a regional processor device load and too low a regional processor device load.

Under the inventive method, load sharing between at least two regional processor devices in a radio communications system is achieved by the following steps. Each regional processor device reports load information, such as peak and/or average loads, at specified time intervals. A load monitor receives these load information reports from the regional processor devices and determines whether any regional processor devices have a high load at or higher than an upper limit or a low load at or less than a lower limit. If the load monitor determines that at least one regional processor device has a high load and at least one regional processor device has a low load, then the load monitor changes over at least one connection from the regional processor device with a high load to the regional processor device with a low load.

The present invention achieves various advantages over the prior art such as more or less eliminating the risk for regional processor device overload for the vast majority of base station controller nodes.

Also, a significant saving in terms of equipment expense and space cost is achievable under the present invention, which should be most apparent in rural applications.

The present invention also permits a simplified introduction of current and future (and more powerful) regional processor devices into sites with older regional processor devices (which might be limited in function to the scanning).

The present invention also permits the dynamic use of regional processor devices in time, capable of handling odd situations arising in the network.

In prior art systems, the number of transceivers to regional processor devices is hard-wired to fit the average conditions for a 'nearly-worst-case' regional processor device situation. Regional processor devices incur such situations only occasionally, meaning equipment and space are not utilized to their best potential.

With the inventive method described herein, the number of transceivers per regional processor device varies dynamically by time. The actual number is based on the current traffic and operation and maintenance situations.

BRIEF DESCRIPTION OF THE DRAWINGS

The invention will now be described in detail with reference to the accompanying drawings in which.

DETAILED DESCRIPTION OF THE PREFERRED EMBODIMENTS

Figure 1:
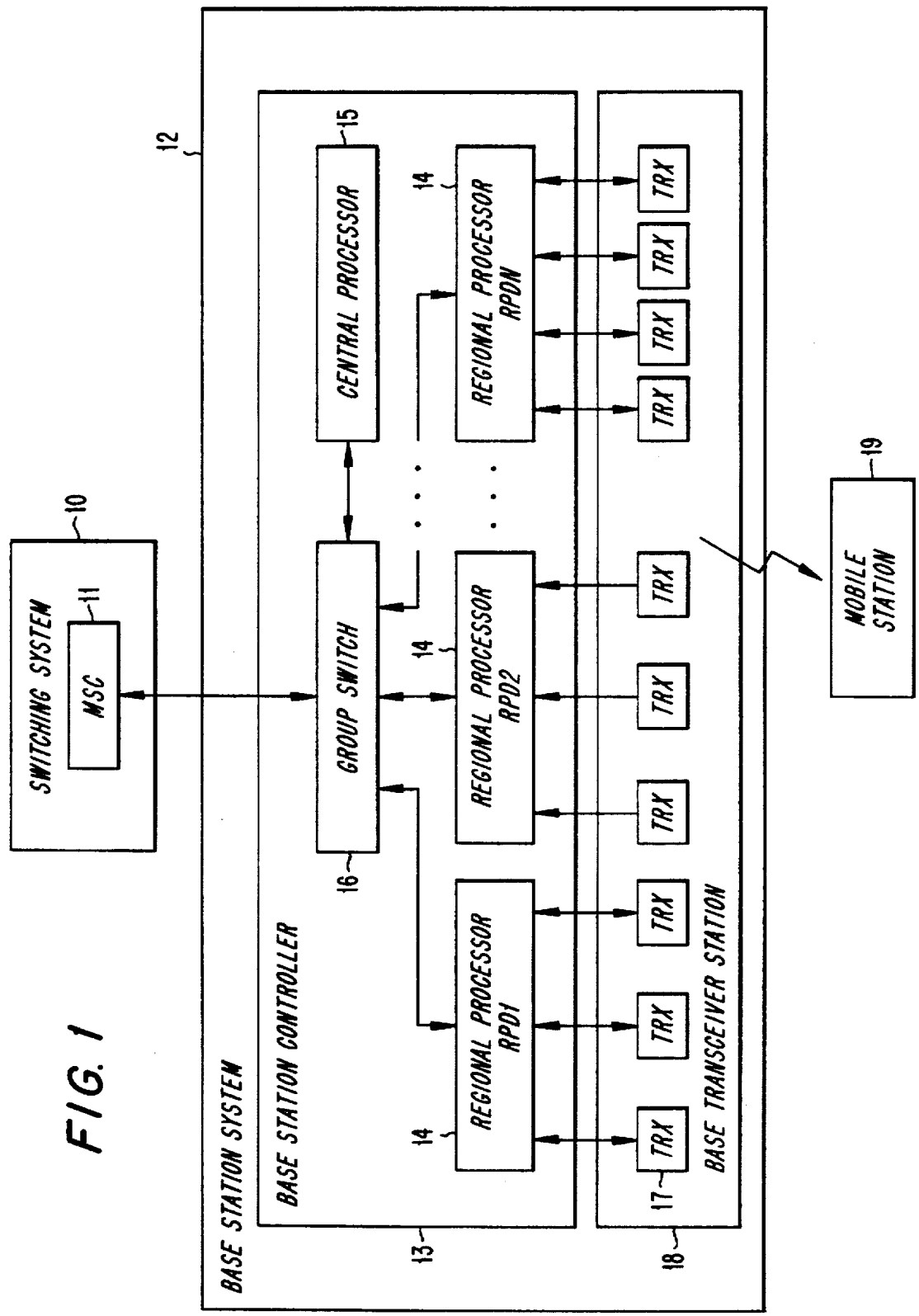
FIG. 1 is a functional block diagram of a cellular radio communications system in which the present invention is usable.

The following exemplary embodiments will be described by way of illustration and not limitation. With reference to FIG. 1, a number of regional processor devices 14 (RPD1, RPD2 ... RPDn) are connected to the central processor 15 through a group switch 16. The regional processing devices 14 are connected to a number of transceivers (TRX's) 17 located at the base station sites. The connections between the regional processing devices 14 and the transceivers 17 can be PCM lines, in accordance with standard GSM hardware.

For completeness, some GSM architecture surrounding the components involved with the present invention is illustrated in FIG. 1. To provide a context for the inventive method, it will be described with reference to the GSM system model CME 20 (a Pan-European digital mobile telephone system). CME 20, which is based on AXE technology, is Ericsson's implementation of GSM.

A cellular radio communication system such as GSM may be basically divided into two sections; a Switching System (SS) 10 and, of interest to the present invention, a Base Station System (BSS) 12. The base station system 12 provides an air interface with a plurality of mobile stations (MS's) 19. The mobile stations 19 are the terminal equipment used by the subscriber.

The switching system 10 and the base station system 12 are subdivided into functional entities. The switching system 10 includes a Mobile Services Switching Center (MSC) 11, which is the interface between GSM and the Public Switched Telephone Network (PSTN)(not shown).

The base station system 12 includes the regional processor devices 14 which provide the processing support for the base station controller 13 and a Base Transceiver Station (BTS) 18, which is the radio equipment needed to serve one cell. The base station transceiver 18 contains the aerial system, the radio frequency power amplifiers and all the digital signal processing equipment needed, including the transceivers 17.

The base station system 12 also includes a Base Station Controller (BSC) 13, which is the functional unit that controls and supervises the base station transceivers 17 and the radio connections in the system. In the CME 20 system, the base station controller 13 is implemented in a AXE 10 switch. The mobile switching center 11 is responsible for set-up and routing of calls to and from mobile subscribers. A lot of other functions are implemented in the mobile switching center 11, e.g., authentication and ciphering.

Each regional processing device 14 handles signalling and call supervision (e.g., locating) over a 64 Kbit/s PCM time-slot for up to four (4), or in some cases three (3), transceivers 17 under standard GSM system structure. The number of transceivers per regional processor device can vary between one and eight in current and envisioned implementations of GSM (while currently only three or four are used). The maximum of four is not a hard limit.

In base station controller applications, the regional processor devices 14 are often referred to Transceiver Handlers (TRH's), thus the title of the present invention.

The configuration rule above (i.e., three to four transceivers per regional processor device) is conventionally applied to all installed regional processor devices, with no regard to traffic (e.g., setting up, clearing and, to some degree the numbers of simultaneous calls (Erlang)) considerations. By applying such considerations, some interesting factors become clear.

For a few regional processor devices, the risk for an overload is evident (resulting in a risk for faulty call supervision, lost calls, etc). This goes for regional processor devices in metropolitan areas in particular, where all the transceivers belong to heavy-duty channels which are likely to have traffic peaks coinciding in time. In such a case, occasionally one or two transceivers 17 might be enough per transceiver handler 14.

On the other hand, for a large number of regional processing devices (most likely the majority), the risk of too low a load is evident (resulting in a wasted equipment expense and space). This is especially true in rural areas, where transceiver quantities are large due to the large areas covered rather than traffic handling reasons. In such cases, a maximum number of twenty transceivers per regional processor, for instance, might be appropriate.

For typical base station controller applications, a mixture of the cases above is expected. That is, while some regional processor devices 14 are overloaded at a certain time, the majority of the regional processor devices 14 are poorly utilized. A better division of transceivers per regional processor device seems advisable. However, as the traffic varies in time, the connections between transceivers and regional processor devices can not be hard-wired for optimization.

To solve these problems, a method and apparatus for load sharing between regional processor devices is described next.

Figure 2:
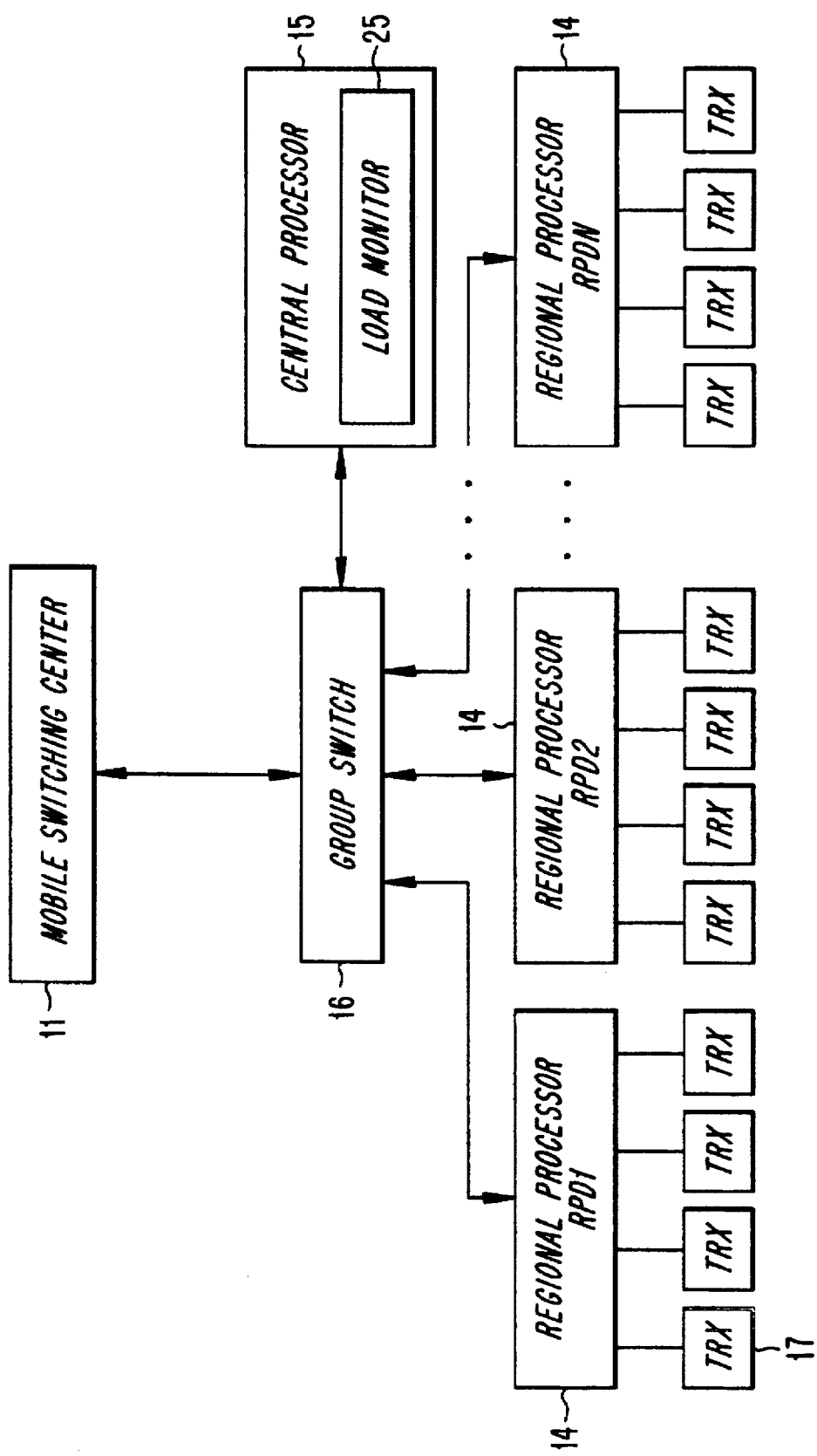
FIG. 2 is a functional block diagram of a cellular radio communications system in which the communication loads of the various regional transceivers is shown.

Initially, a number of transceivers are connected to each regional processing device. With reference to the load situation shown in FIG. 2, assume the load of a first regional processing device RPD1 is rising, thereby indicating potential load problems. To address the load problems, a load monitor 25 is included in the central processor 15. The load monitor 25 is best suited for software implementation. This gives the best opportunities regarding operation and statistics, while having low processing demands.

Figure 3:
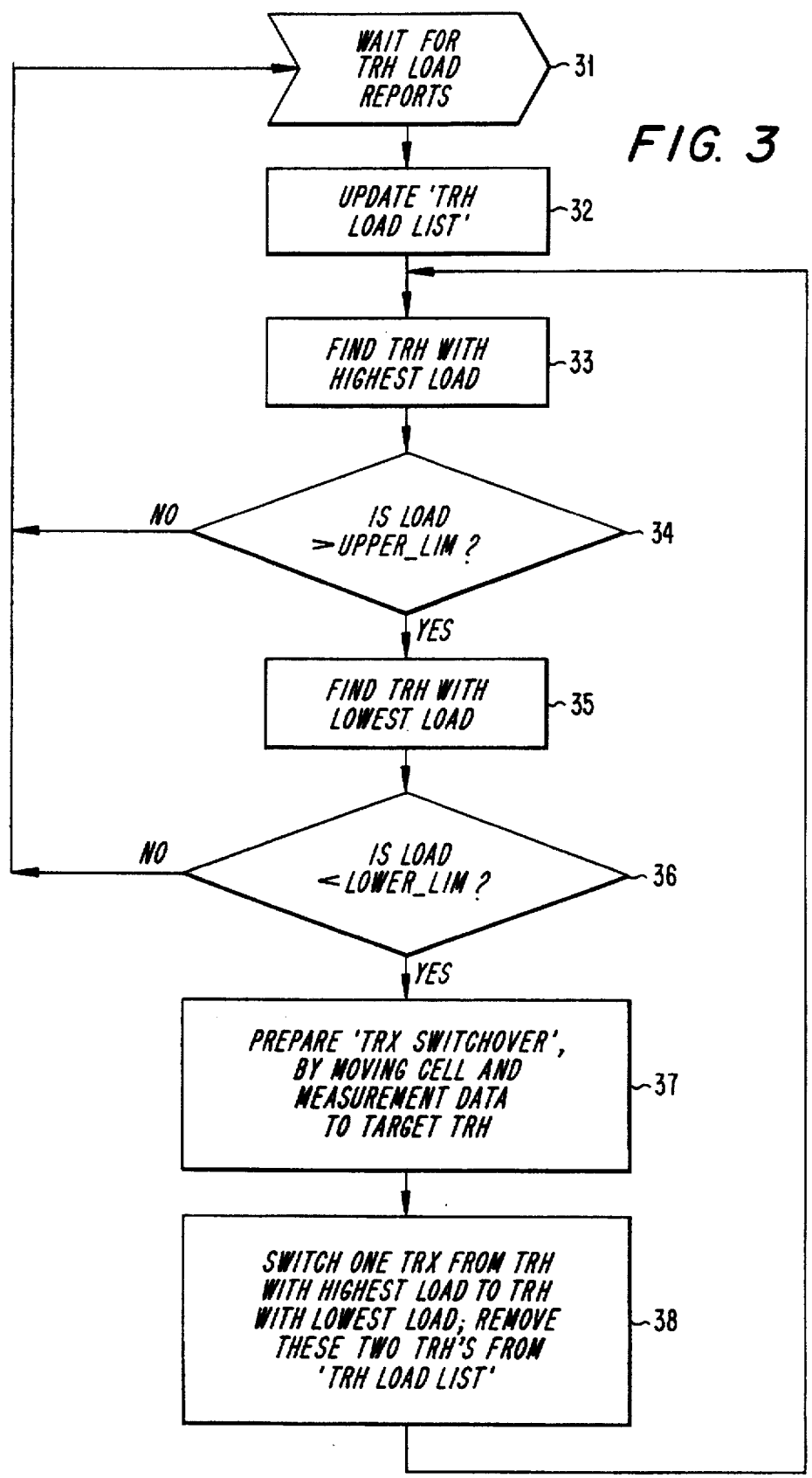
FIG. 3 is a flow chart of the process steps in accordance with the present invention.

The load sharing mechanism will now be described with references to the process steps of FIG. 3 (wherein the specific values are offered only by way of example):

(a) Each regional processor device reports the average (and/or peak) load for an elapsed time, e.g., at 5 minute intervals (Step 31). For example, a signal REP_INT might be sent to a load monitor in the central processor.

(b) The load monitor updates a load list (Step 32), determines which transceiver has the highest load (step 33), and checks whether any regional processor device has reported a load above 80% (UPPER_LIM), for example (step 34). If no regional processor has a load at or above the upper limit, the method returns to wait for more load reports (step 31).

(c) If a regional processor device is found to have a load at or above an upper limit, the load monitor finds the regional processor device with the lowest load (step 35), and checks whether there are any regional processor devices with a load below 30% (LOWER_LIM), for example (step 36). If no regional processor device is found to have a load at or below the lower limit, then the method returns to await the next set of load reports (step 31).

(d) If a regional processor device with a low load is found (step 36), a change-over of one transceiver connection from the regional processor device with the highest load to the regional processor device with the lowest load is prepared (T1 from RPD1 to RPD2, for example) (step 37).

To make such a transfer as smooth as possible, the following measures are taken: (1) transfer of recent generations of reported measurement data (for transceiver connection TRX T1) from a first regional processor device RPD1 to a second regional processor device RPD2, and (2) loading of relevant cell data (for TRX T1) from the central processor to the second regional processor device RPD2. The measurement data is reported every 0.48 seconds, for example, and may include data on signal strength of a received signal, signal quality (e.g., bit error rate) of received signal, transmitting power used, signal strength of up to six neighboring cells, information regarding whether discontinuous transmission/reception is in use, etc.

(e) When the second regional processor device RPD2 is prepared to take over the connection T1 from the first regional processor device RPD1, a change-over is executed (through the group switch)(step 38).

(f) Steps (a) to (d) above (steps 33–38 in FIG. 3) are repeated to transfer a transceiver from a regional processor device with the second highest load to a regional processor device with the second lowest load, etc.

The change-over of transceiver connections from one regional processor device 14 to another can be compared to when a redundant regional processor device is connected at a regional processor device failure (which is a capability of current base station controllers). In this case, the disturbance an traffic is estimated to be quite low. However, for the case described herein, the traffic disturbance will be even less (perhaps virtually zero). The reason is that the target regional processor device will be prepared by data transfers prior to the changeover.

The present invention has been described by way of example with respect to a GSM system. It should be noted that the inventive concept may be implemented and/or adapted to other systems. Also, variations from the hardware and software disclosed herein are to be expected without departing from the scope and content of the invention, as measured by the claims appended hereto.

I claim:

1. In a radio communication base station system among a plurality of base station systems, said base station systems including at least two regional processor devices, each for a number of radio unit connections, at least one regional processor device serving a first plurality of transceivers having high traffic demands and at least another regional processor device serving a second plurality of transceivers having low traffic demands, a method for load sharing between said at least one regional processor device and said at least another regional processor device, comprising the steps of:

reporting from each regional processor device load information for that specific regional processor device and at specific time intervals, determining, in a load monitor receiving said load information reports from each of said regional processor devices, whether any regional processor device has a high load not less than an upper limit or a low load not greater than a lower limit; and, if said at least another regional processor device serving said second plurality of transceivers is determined by said load monitor to have a low load, changing over at least one connection from said one regional processor device serving said first plurality of transceivers to said another regional processor device serving said second plurality of transceivers.

2. A method in accordance with claim 1, wherein said load information includes average load information, peak load information, or both average load information and peak load information.

3. A method in accordance with claim 1, wherein each regional processor device includes a plurality of transceiver units.

4. A method in accordance with claim 3, wherein said load information includes load information specific to each of said transceiver units.

5. A method in accordance with claim 1, wherein said change-over step includes:

transferring recent reported measurement data for a transceiver connection from the regional processor device with a high load to the regional processor device with a low load; and loading of relevant cell data of a transceiver connection to the regional processor device with a low load, to make such a transfer smooth.

6. A method in accordance with claim 1, wherein said method is carried out in a GSM cellular radio communication switch unit.

7. A radio communication base station system among a plurality of base station systems, said base station systems including regional processor devices, each for a number of radio unit connections, a first plurality of transceivers having high traffic demands and at least one regional processor device serving a second plurality of transceivers having low traffic demands, including means for reporting from each regional processor device load information at specific time intervals, load monitoring means receiving said load information reporting from each of said regional processor devices for determining whether any regional processor device has a high load not less than an upper limit or a low load not greater than a lower limit; and switching means for changing over at least one connection from the regional processor device serving said first plurality of transceivers to a connection from the regional processor device serving said second plurality of transceivers if at least one regional processor device serving said second plurality of transceivers is determined by said load monitor to have a low load.

8. A radio communication base station system in accordance with claim 7, wherein said load information includes average load information, peak load information, or both average load information and peak load information.

9. A radio communication base station system in accordance with claim 7, wherein each regional processor device includes a plurality of transceiver units.

10. A radio communication base station system in accordance with claim 9, wherein said load information includes load information specific to each of said transceiver units.

11. A radio communication base station system in accordance with claim 7, wherein said switching means includes:

means for transferring recent reported measurement data for a transceiver connection from the regional processor device with a high load to the regional processor device with a low load; and means for loading of relevant cell data of a transceiver connection to the regional processor device with a low load, to make such a transfer smooth.

* * * * *